US012709862B2

(12) United States Patent
Koponen et al.

(10) Patent No.: US 12,709,862 B2
(45) Date of Patent: Aug. 18, 2026

(54) WORK DEVICE

(71) Applicant: TMK MACHINERY OY, Hankasalmi (FI)

(72) Inventors: Tenho Koponen, Säkinmäki (FI); Mika Koponen, Hyvinkää (FI)

(73) Assignee: TMK MACHINERY OY, Hankasalmi (FI)

( * ) Notice: Subject to any disclaimer, the term of this patent is extended or adjusted under 35 U.S.C. 154(b) by 494 days.

(21) Appl. No.: 18/034,314

(22) PCT Filed: Oct. 29, 2021

(86) PCT No.: PCT/FI2021/050739
§ 371 (c)(1),
(2) Date: Apr. 27, 2023

(87) PCT Pub. No.: WO2022/090633
PCT Pub. Date: May 5, 2022

(65) Prior Publication Data

US 2023/0399811 A1 Dec. 14, 2023

(30) Foreign Application Priority Data

Oct. 29, 2020 (FI) ...................................... 20206077

(51) Int. Cl.
*E02F 3/40* (2006.01)
*A01G 23/06* (2006.01)
(Continued)

(52) U.S. Cl.
CPC ............ *E02F 3/404* (2013.01); *A01G 23/062* (2013.01); *E02F 3/4135* (2013.01); *E02F 3/965* (2013.01)

(58) Field of Classification Search
CPC .............. E02F 3/404; E02F 3/413; E02F 3/47
(Continued)

(56) References Cited

U.S. PATENT DOCUMENTS

| | | | |
|---|---|---|---|
| 4,069,846 | A | 1/1978 | Forslund |
| 4,198,747 | A | 4/1980 | LaBounty |

(Continued)

FOREIGN PATENT DOCUMENTS

| | | | | |
|---|---|---|---|---|
| AU | 717522 | B2 * | 3/2000 | ............. E02F 3/404 |
| AU | 2016203401 | A1 | 12/2016 | |
| FI | 780836 | A | 9/1978 | |

OTHER PUBLICATIONS

International Search Report and Written Opinion in corresponding International Patent Application No. PCT/FI2021/050739, mailed Feb. 24, 2022, 11 pages.

(Continued)

*Primary Examiner* — Christopher J Sebesta
*Assistant Examiner* — Evan A Bregel
(74) *Attorney, Agent, or Firm* — FisherBroyles, LLP; Robert Kinberg

(57) ABSTRACT

The invention relates to a work device having a body with an attachment arrangement to attach the work device to a set of booms of a work machine. A pair of jaws fitted to the body includes two jaws arranged to form a grab. A first jaw is fixed to the body and a second jaw is pivoted rotatably to the body to open and close the grab. The rotatable jaw is arranged to be acted on by a hydraulic actuator, to open and close the grab. Between the hydraulic actuator and the rotatable jaw is a wide-angle pivot setup. An arm mechanism, equipped with two pivots fitted to a jaw arm is arranged to belong to the wide-angle pivot setup. In addition, the wide-angle pivot setup is arranged to include a rotatable lever arm fitted between the jaw arm and the body. The rotation angle of the movement created in the rotatable jaw by the wide-angle pivot setup has a magnitude of more than 120°.

17 Claims, 11 Drawing Sheets

(51) Int. Cl.
*E02F 3/413* (2006.01)
*E02F 3/96* (2006.01)

(58) Field of Classification Search
USPC ........... 37/406, 340; 414/729, 738, 739, 740
See application file for complete search history.

(56) References Cited

U.S. PATENT DOCUMENTS

| | | | | |
|---|---|---|---|---|
| 5,865,492 | A * | 2/1999 | Horton | E02F 3/3677 294/197 |
| 6,058,632 | A | 5/2000 | Hawkins | |
| 6,176,531 | B1 * | 1/2001 | Wheeler | B66C 3/16 294/197 |
| 6,494,515 | B1 * | 12/2002 | Kalbfleisch | E02F 3/963 414/23 |
| 7,617,619 | B2 | 11/2009 | Cox | |
| 2013/0042507 | A1 * | 2/2013 | Seda | E02F 3/404 37/406 |

OTHER PUBLICATIONS

International Preliminary Report on Patentability in corresponding International Patent Application No. PCT/FI2021/050739, mailed Jan. 25, 2023, 20 pages.

Finnish Search Report in corresponding Finnish Patent Application No. FI20206077, dated May 11, 2021, 1 page.

* cited by examiner 14
46
32
32
11
31
30
12
10
22
48, (66)
43
T M K
41
42
15, 15'
40
27

WORK DEVICE

CROSS-REFERENCE TO RELATED APPLICATIONS

This application is a U.S. National Stage of International Patent Application No: PCT/FI2021/050739 filed on Oct. 29, 2021, which claims benefit of Finland Patent Application No. FI 20206077 filed on Oct. 29, 2020.

FIELD OF THE INVENTION

An object of the invention is to a work device, more particularly to a work device with a grab.

BACKGROUND OF THE INVENTION

Various stump-grubbing harrows are known. They are intended to scrape ground to loosen stumps, root clumps, and stones, for example, when clearing land for cultivation. Stump-grubbing harrows can be attached, for example, to the end of a set of booms of an excavator, the harrow being operated by using the set of booms. If necessary, a stump-grubbing harrow can also be used for scarifying. A stump-grubbing harrow is typically formed of set of curved claws arranged in rows, using the points of which the aforementioned operations are carried out. However, a stump-grubbing harrow cannot be used to perform, for example, effective and precise materials handling, i.e., for example, moving objects from one place to another.

Further, more developed means are known, especially for handling stumps. One example is the device marketed by Tervolan Konepaja Oy under the product name Pallari, which the manufacturer calls a stump harvester. It too can be attached to the end of set of booms of an excavator. The stump harvester is designed especially for stump lifting and particularly for chopping them. It can be used to lift stumps from the ground and/or to chop them already in the ground or when lifted from it.

The stump harvester is formed, for example, of two fixed claws arranged next to each other with a claw moveable against them, which is arranged to go between the fixed claws. The cutting claw thus acts as a moveable jaw and also as a blade. The object, i.e. the stump, or part of it intended to be processed by the device can be pressed between the moveable claw and the fixed claws. In addition, the stump harvester can also be used to break up tussocks. For that a fixed tussocking element is integrated on the opposite side of the fixed claws to the moveable claw. It can be used to push the ground open.

Another stump harvester is known from Finnish patent application publication number FI 780836 A. Stump harvesters are characterized by a great power output requirement. The same also applies to various crushing grabs, in which in addition to a moveable jaw, crushing is often further boosted by an impact device implemented, for example, as a hydraulic hammer. In the latter of the two aforementioned stump harvesters, the great power output is obtained using a moment arm. This is located between the end of the operating element of the hydraulic actuator and the moveable claw. An adjustable moment is obtained by means of a moment arm arranged with a changeable angle attitude. However, stump harvesters can only be used to perform the effective and precise processing of stumps. Examples of other work are the lifting and transfer of stones from one place to another. Which is even less successful using a crushing grab.

Various grabs, which are also called grab buckets, are also known. They are intended especially for material handling. They include two moveable jaws, which can be arranged opposite each other. Both of the jaws are then pivoted rotatably, so that the grab can be closed and opened. The grab is typically used to grip the object to be handled, move it to another location, and release the object. The object to be moved is thus gripped by the grab, and pressed between its jaws. The grab cannot, however, be used, for example, to effectively handle stumps, such as lifting them, or for soil tilling.

If it is wished to perform all these operations efficiently and well, for which the aforementioned tools and devices are intended, then all of the aforementioned tools will be required. The threshold in investing in all of them may be high and, on the other hand, when not used the acquired tools will also tie up capital. The logistics relating to the devices also creates its own special challenge. In the worst case, all the tools may be needed at the same work site, to perform the work efficiently and well. In addition, switching from one tool to another between different tasks takes time and reduces effective and productive operation, even though the work machine and tools are equipped with quick connectors.

SUMMARY OF THE INVENTION

The invention is intended to create a multi-purpose work device.

The work device according to the invention is suitable not only for compromise-free grab operation, but also for tearing, separating, and demolition, for collecting the material being handled without grab operation, and even for soil tilling. This is all made possible by the fixed jaw and the jaw arranged to move relative to it, arranged to form a grab. The fixed jaw can be made sufficiently strong, for example, for soil tilling and material handling that take place by "shovelling", i.e. for transfer taking place by pushing the material.

According to one embodiment, the moveable jaw can, in turn, be narrower than the fixed jaw. This improves the visibility of the material being processed and the processing object. In addition, the moveable jaw can, if necessary, be turned out of the way when not needed, using an arm mechanism arranged for it, making unobstructed operations with the fixed jaw of the work device possible. The moveable jaw can even be turned out of the way in a selected direction.

The work device includes a wide-angle pivot setup for the moveable jaw. According to one exemplary embodiment, it can be implemented by an arm mechanism equipped with two pivots between the hydraulic actuator and the moveable jaw. The arm mechanism with two pivots is then arranged to form a wide-angle pivot. The magnitude of the rotation angle of the movement created for the jaw arranged to move by the wide-angle pivot is more than 120°. The straight movement created by the hydraulic actuator is converted into a wide rotation movement of the moveable jaw with the aid of the wide-angle pivot setup, which, according to one embodiment, the arm mechanism equipped with two pivots is arranged to form. Thanks to the arm mechanism, more generally the wide-angle pivot setup, the moveable jaw, for example, from its base part, is made even mainly parallel to the hydraulic actuator, at both extreme ends of the movement of the jaw. This is when the grab is fully opened as an extension of the hydraulic actuator as well as also when the grab is fully closed and mainly parallel to the hydraulic actuator.

According to one embodiment, the wide-angle pivot setup can include, in addition to an arm mechanism equipped with two pivots, more particularly, the jaw arm, a lever arm arranged to rotate. The lever arm is fitted between the jaw arm and the body, to change the movement of the moving operating element of the hydraulic actuator into a rotational movement of the jaw arranged to move. At one end, the lever arm can be pivoted to the body of the device. According to one embodiment, the lever arm is pivoted at the other end to the same pivot point from which the jaws arm is attached to the operating element of the hydraulic actuator. The other additional advantages obtained through the invention appear in the description portion, and its characteristic features are stated in the accompanying Claims.

BRIEF DESCRIPTION OF THE DRAWINGS

The invention, which is not restricted to the embodiments presented in the following, is described in greater detail with reference to the accompanying Figures, in which.

DETAILED DESCRIPTION OF THE INVENTION

Figure 1:
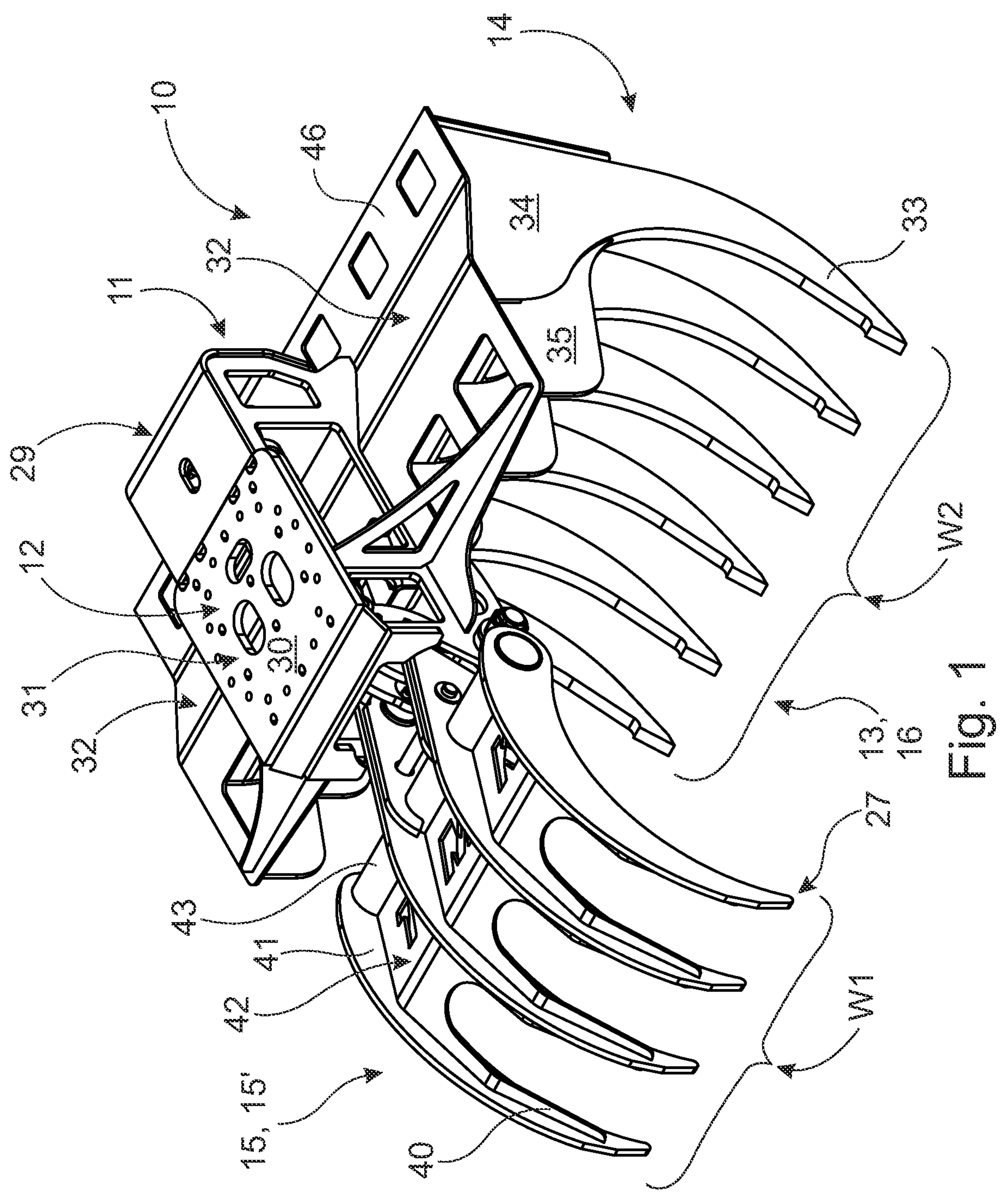
FIG. 1 shows an angled view of an example of the work device.
Figure 2:
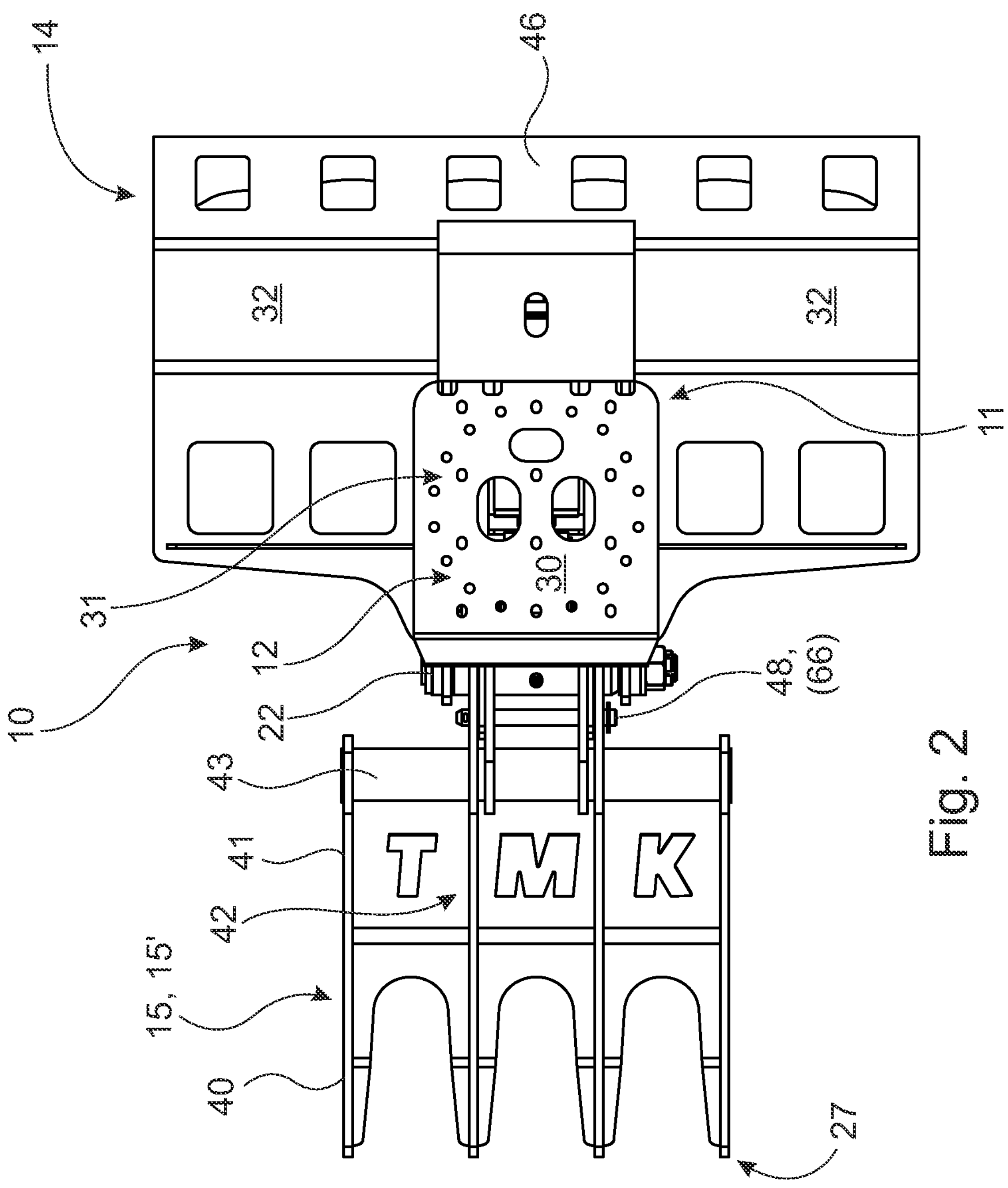
FIG. 2 shows a top view of the work device shown in FIG. 1.
Figure 3:
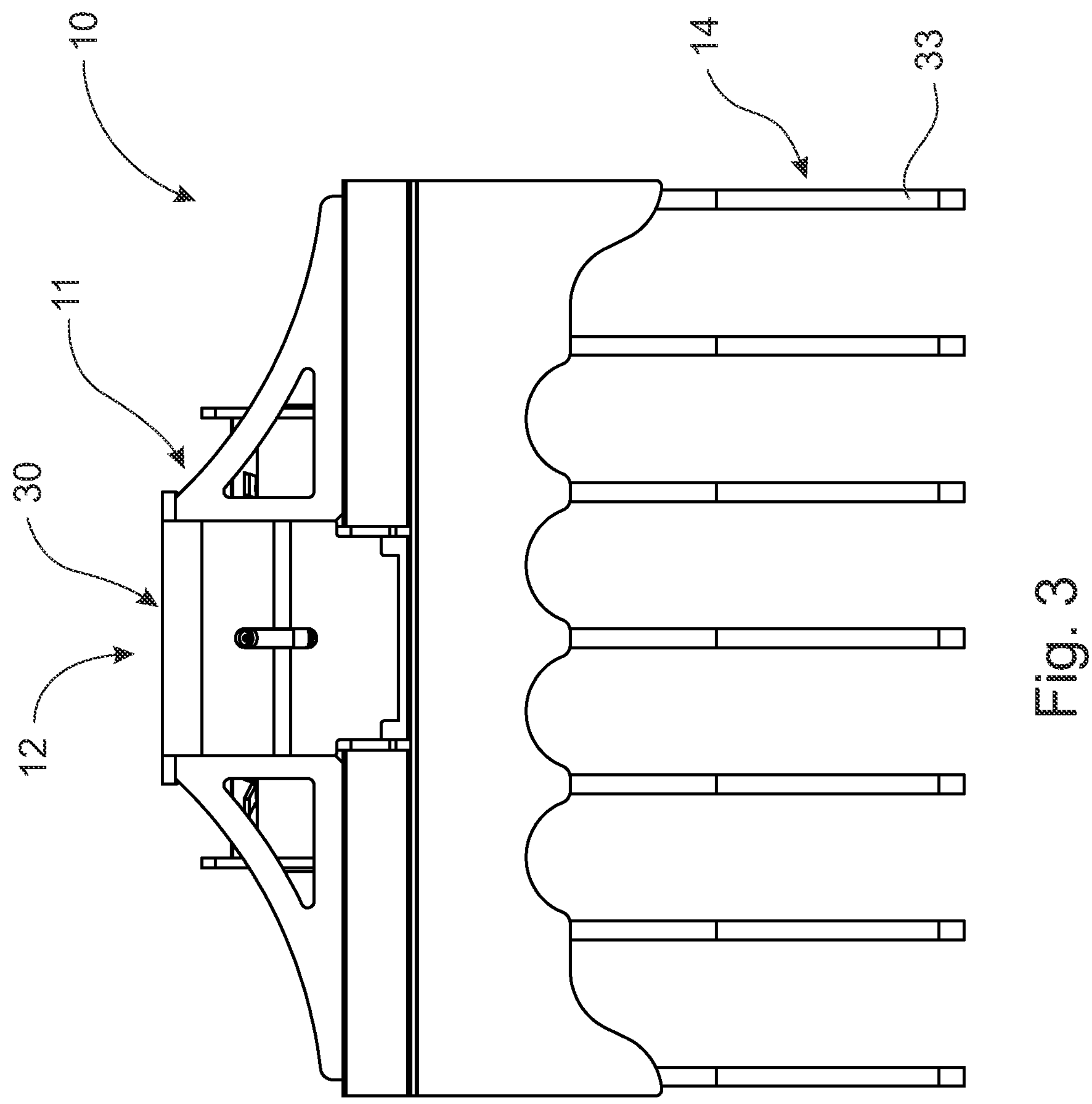
FIG. 3 shows a side view of the work device shown in FIGS. 1 and 2 from the side of the fixed jaw.

FIGS. 1-3 show an example of the work device 10 according to the invention. FIG. 1 shows an angled view of the work device 10, FIG. 2 a top view of it, and FIG. 3 a side view seen from the side of the fixed jaw 14. The work device 10 includes, as basic parts, a body 11, a pair of jaws 13 arranged to form a grab 16, and a hydraulic actuator 17 for the grab 16, i.e. for opening and closing it.

The body 11 of the work device 10 is equipped with an attachment arrangement 12 to arrange the work device 10 at the end of a set of booms of the work machine (not shown). The work machine can be, for example, an excavator. The end of the set of booms of the excavator can be equipped, in an as such known manner, with a bucket rotation set of arms and an attachment interface for a work device. The set of booms includes, as is known, a main boom pivoted to the work machine, with an arm pivoted at its end, which is also often called an excavating arm. At its end is the attachment interface of the work device 10, or at least part of it. At the end of the set of booms there can be a possible selected quick connector. By being equipped with a selected compatible counter-piece, i.e. an adapter, the work tool, such as, for example, a bucket, or now, in the case of the invention, a work device 10 according to the invention, can be detachably connected by its counter-piece to the quick connector, for example, without tools, and without the operator leaving the cab. The quick connector can be arranged directly in the pivot points of the bucket rotation at the end of the set of booms. On the other hand, it can also be in, for example, a rotator or a combination of a bucket rotator and a tilt, i.e. in a rototilt, as a part of them. The attachment arrangement 12 can, of course, also be fitted directly to the rotator, i.e. with no special adapters.

The body 11 is arranged to form a casing structure 29. The casing structure 29 can be, for example, of sheet metal work. There can be stiffening casing beams in it. On the upper surface 30 of the casing structure 29 there is now an opening arrangement 31 as the attachment arrangement 12. The opening arrangement 31 is arranged to be such that it is suitable for two or more quick-release attachment adapters, i.e. their counter-pieces to be connected to the work device 10. Each counter-piece of adapter model can have its own opening in the opening arrangement 31. The counter-piece is to be attached to the openings by, for example, bolts. Thus, thanks to the opening arrangement 31, several different adapter models can be arranged for the work device 10, with numerous different types available for excavators, or alternatively also for direct attachment to rotators, equipped with, for example, tilting.

Figure 4:
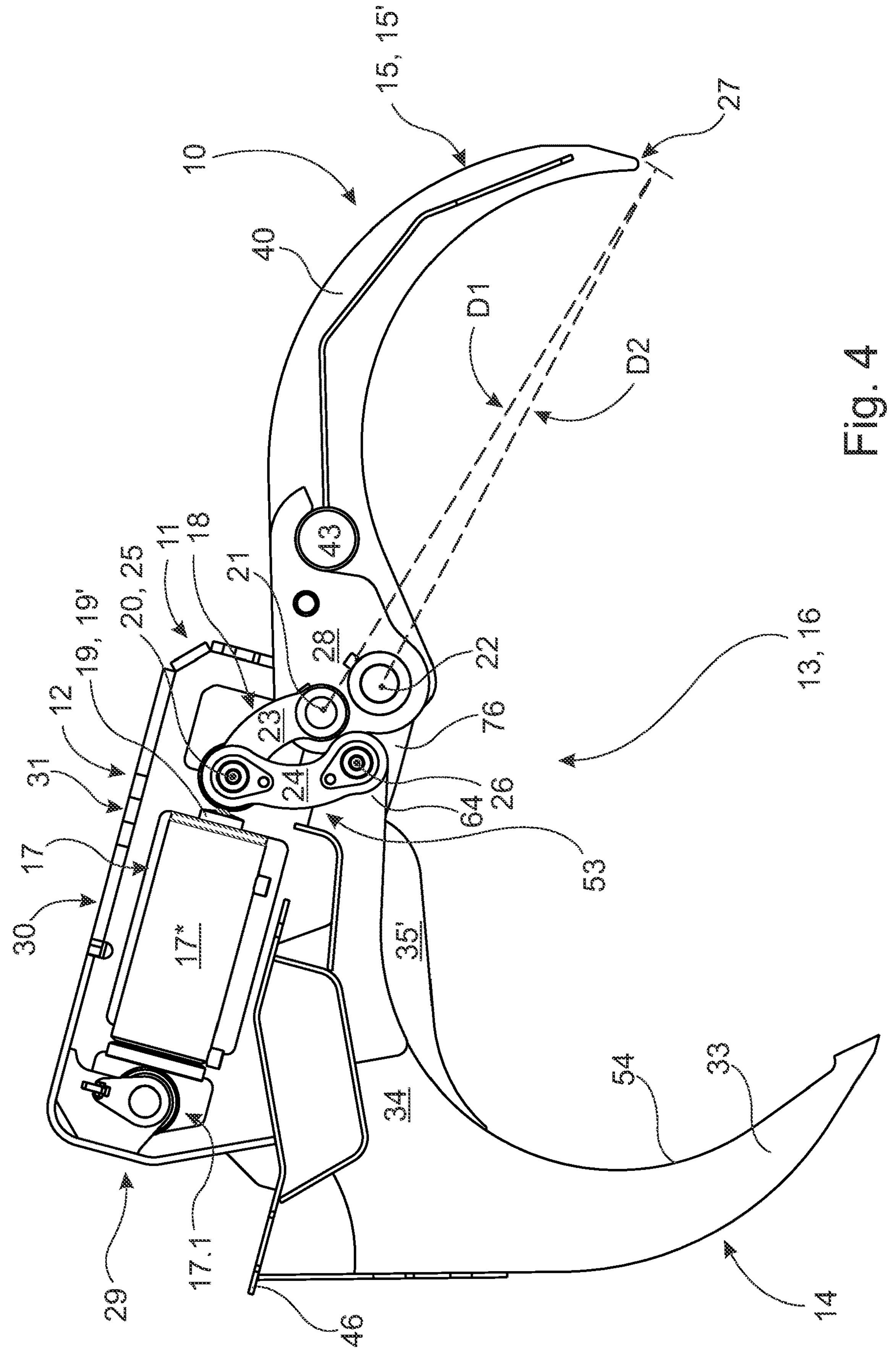
FIG. 4 shows a cross-section of the work device shown in FIGS. 1-3, with the grab fully open.
Figure 5:
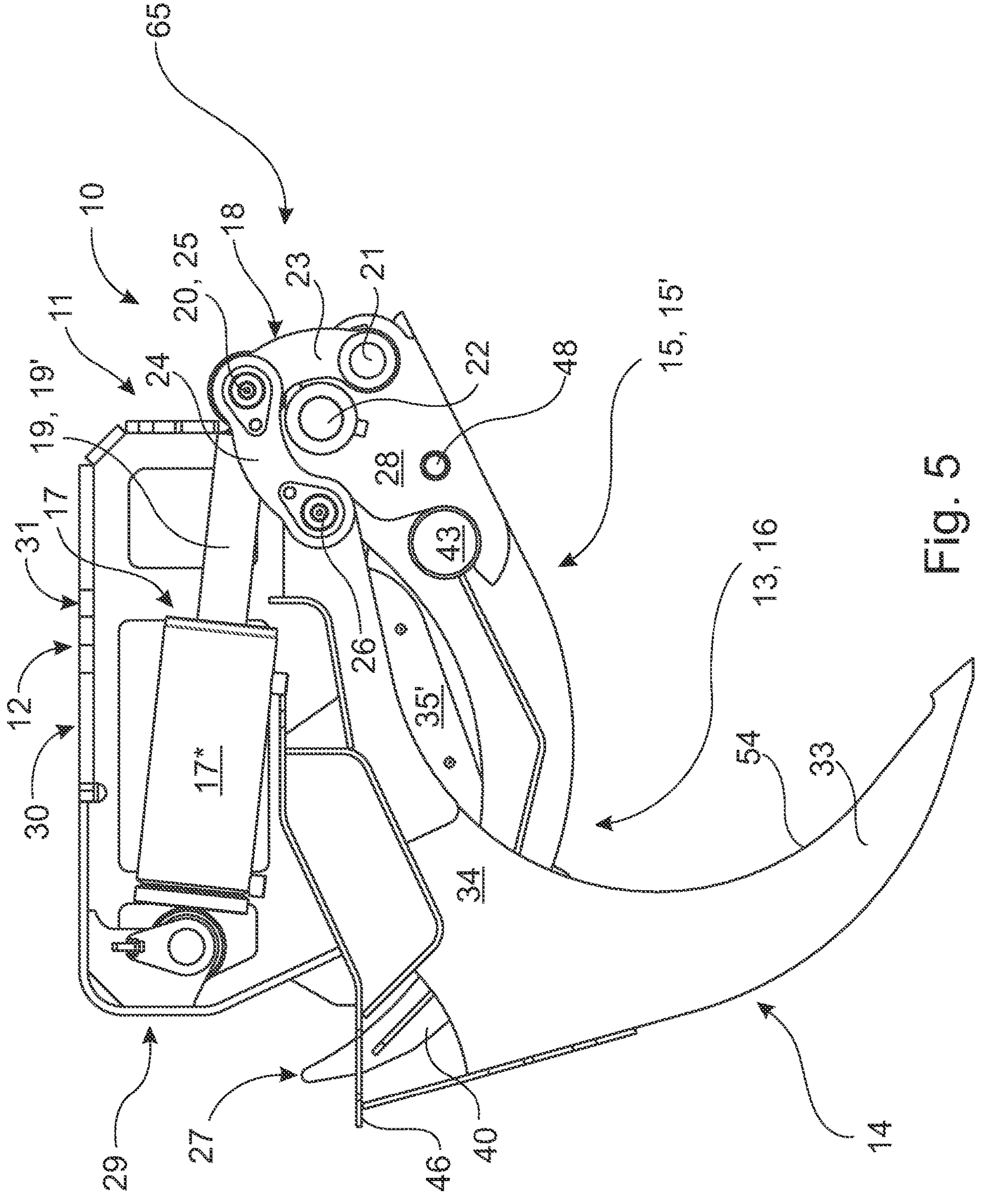
FIG. 5 shows a cross-section of the work device shown in FIGS. 1-3, with the grab fully closed.

With reference to FIGS. 4 and 5, a pair of jaws 13 is fitted to the body 11 of the work device 10. The pair of jaws 13 includes two jaws 14, 15 arranged to form a grab 16. Both of the jaws 14, 15 are now curved. The first of the jaws 14 forming the pair of jaws 13 of the grab 16 is fitted permanently in the body 11, i.e. immovably relative to the body 11. The body 11 continues in the lateral direction of the work device 10, as a sheet-metal structure 32 on both sides of the casing structure 29. The curved claws 33 belonging to the fixed jaw 14 are joined to the sheet-metal structure 32 at their roots 34. Here the roots 34 can also be termed the cheek plate of the jaw 14.

The roots 34 can include an extension 35, 35' arranged to continue under the body 11. The extension 35, 35' is one way to continue the reach of the inner curve 54 of the jaw 14 over most of the grab 16 from its upper part. Thus, the share of the fixed jaw 14 is arranged to be more than half of the grab 16. In addition, it can be stated that the inner curve 54 of the fixed jaw 14 is arranged to extend over most of the body 11.

The extensions 35, 35' can form zones laterally in the grab 16. In the middle of the grab 16, for example, in the area of the moving jaw 15, the extension 35' can be lower, thus forming a larger space in bottom of the grab 16 (FIGS. 4 and 5). On both sides of the moveable jaw 15 laterally in the grab 16, the extensions 35 can, in turn, be higher (FIGS. 1 and 6) than in the middle area. The larger space in the middle of the grab 16 facilitates, for example, handling stones. The higher extension 35 at the sides of the grab 16 in turn facilitates handling longer objects (e.g., planks or pipes).

The other jaw 15, arranged to form the grab 16, is pivoted rotatably to the body 11, to open and close the grab 16. Thus the jaw 15 is fitted moveably to the grab 16 and body 11. The movement is created by a hydraulic actuator 17. Using it, the jaw 15 is rotated relative to the rotation pivot 22 arranged in the work device 10. The fixing and integration of the other jaw 14 even as part of the actual body 11 creates a strong body for the work device 10. The grab 16 will then withstand even violent torsion and hard work.

Figure 6:
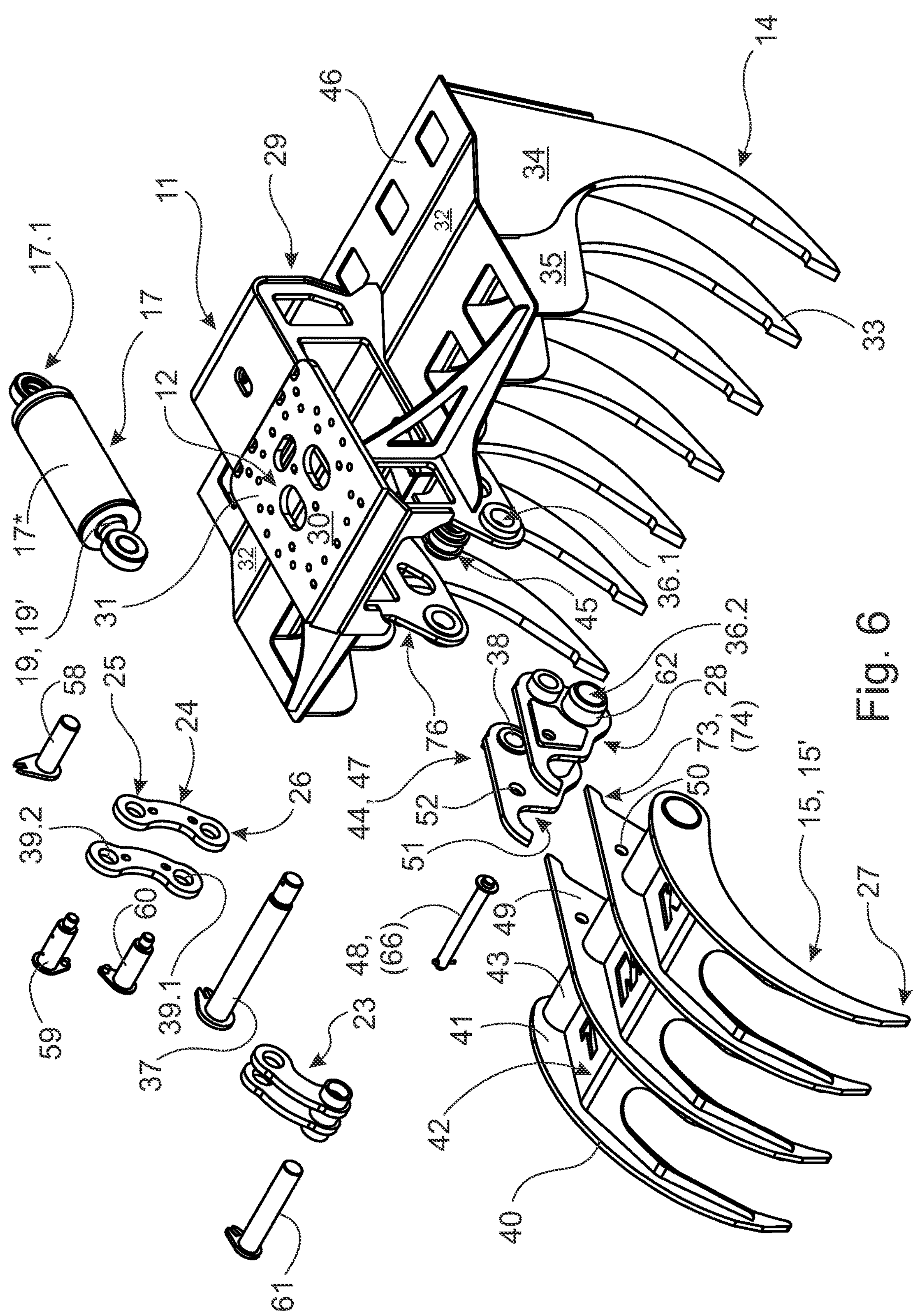
FIG. 6 shows an angled exploded view of the structural components of the work device shown in FIGS. 1-5.
Figure 7:
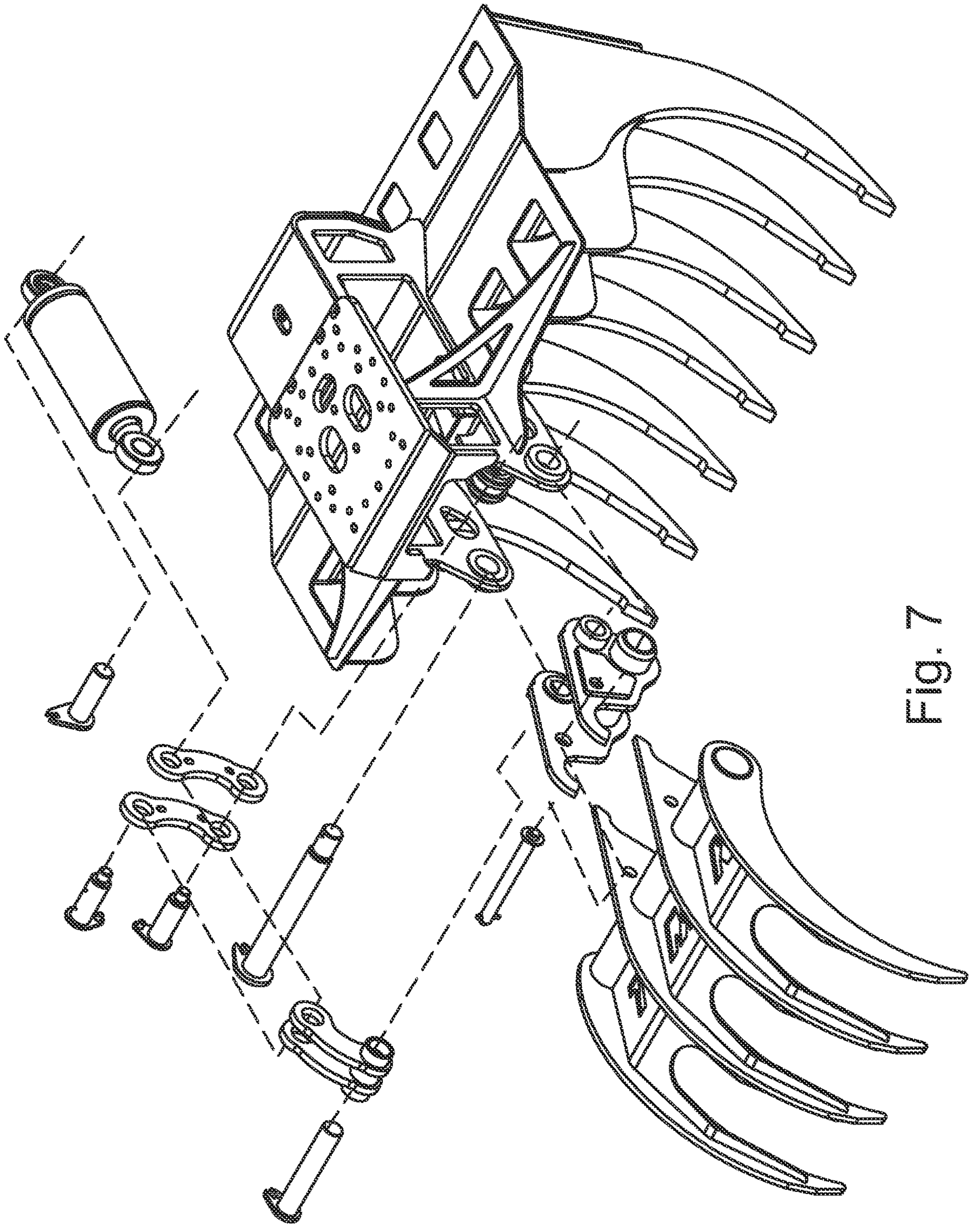
FIG. 7 shows an angled exploded view of how the structural components of the work device of FIG. 6 are joined together.

There are pivot-point openings 36.1, 36.2 for the moveable jaw 15 in the body 11 of the work device 10 and in the moveable jaw 15 (or in the quick connector 47, FIG. 8*a*, fitted rotatably for it in the body 11), through which pivoting is achieved (FIGS. 6 and 7). The jaw 15 is connected to the body 11 (and to the aforesaid quick connector 47 arranged rotatably with it) by the pivot pin 37 (FIGS. 6 and 7) running through the openings 36.1, 36.2. The openings 36.1 are in lug plates 76 protruding from the body 11.

The hydraulic actuator 17 is equipped with a moving operating element 19. In this case the operating element 19 is formed by a piston rod 19', arranged to move back and forwards in the hydraulic actuator 17. The piston at its end is arranged to move back and forwards inside its cylinder part 17*, due to the effect of a pressure medium, such as, for example, a liquid. At one end 17.1 the hydraulic actuator 17 is attached, in this case by its cylinder part 17*, by a pin 58 (FIG. 6) to a loop in the body 11 of the work device 10. The operating element 19, i.e. now the piston rod 19', is arranged to act on the moveable jaw 15, to open and close the grab 16.

The operating element 19, more generally the hydraulic actuator 17, is arranged to act on one of the jaws 15 of the pair of jaws 13 forming the grab 16, by means of a wide-angle pivot setup 53 belonging to the work device 10. The rotation angle of the movement created by the wide-angle pivot setup 53 for the moveable jaw 15, has a magnitude of more than 120°. The angle can be defined from the moveable jaw 15, for example, with the aid of two selected fixed points. The fixed points form straight lines and the angle between the straight lines is measured when the jaw 15 is in its extreme positions. Several significant advantages are achieved by the wide-angle pivot setup 53, which, for example, increase the versatility of the work device 10 and work ergonomics.

According to one embodiment, the wide-angle pivot setup 53 can be formed by an arm mechanism 18 equipped with at least two pivots 20, 21. The arm mechanism 18 for opening and closing the grab 16, by the movement of the moving operating element 19 of the hydraulic actuator 17, is between the moving operating element 19 of the hydraulic actuator 17 and the moveable jaw 15. In other words, to the moveable jaw 15 is arranged to be acted through the arm mechanism 18. Thus, in the embodiment described, the moving operating element 19 of the hydraulic actuator 17 is not attached directly through a single pivot to the moveable jaw 15, instead it is arranged to act on the moveable jaw 15 through the wide-angle pivot setup 53, i.e., in the embodiment described, through the arm mechanism 18. Action through the arm mechanism 18 can also be termed indirect.

Figure 12:
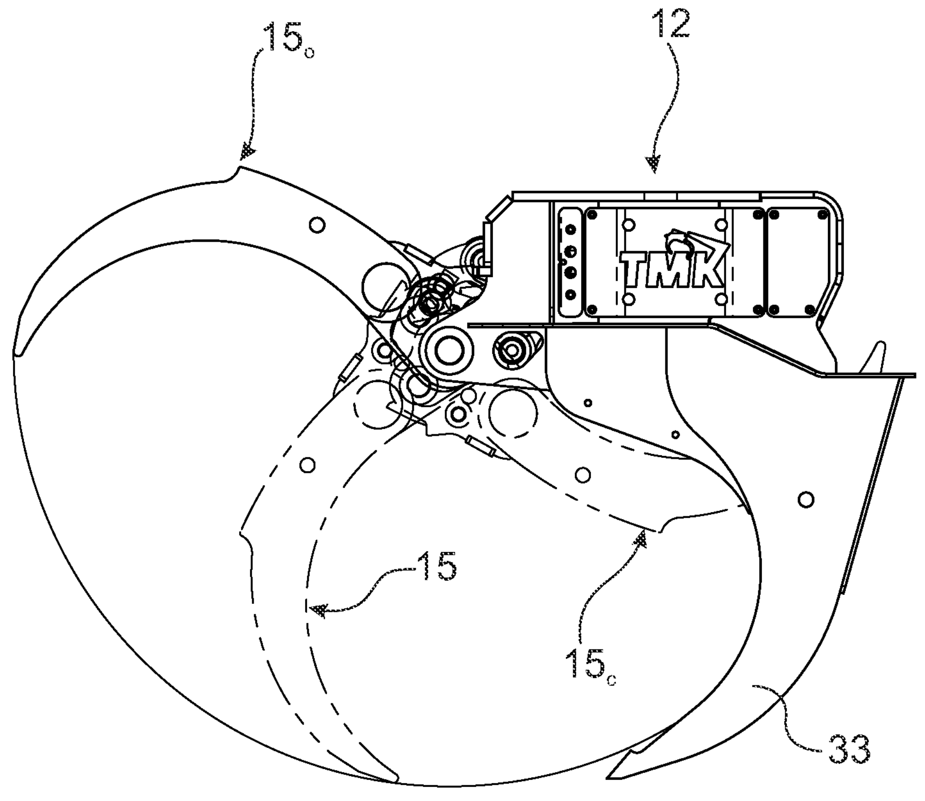
FIG. 12 shows a side view of the work device and the opening angle of the moveable jaw.

An advantage of the arm mechanism 18, more generally, of the wide-angle pivot setup 53, is the large rotation movement created for the moveable jaw 15, i.e. the large opening of the grab 16 (FIG. 4) and also of the closing of the grab 16, i.e. the rotation of the moveable jaw 15 to the roots of the fixed jaw (FIG. 5). The wide-angle pivot setup 53 is arranged to create a rotation movement, i.e. a movement range, of the moveable jaw 15, of a magnitude of, for example, 120°-180°, 140°-180°, more particularly 150°-180°, and even more particularly 160°-180°. In the Figures, the movement range of the moveable jaw 15 of the work device 10 shown as a one example is stated as a rotation angle of 170°, which can be seen in FIGS. 4, 5 and especially in FIG. 12. The angle can be measured, for example, using as an aid a straight line drawn through the rotation pivot 22 of the jaw 15 and the tubular shaft 43, when the jaw 15 is in its extreme positions, i.e., the grab 16 fully open ($\mathbf{15}_o$, FIG. 12) and the grab 16 fully closed ($\mathbf{15}_c$, FIG. 12). The arm mechanism 18 equipped with two pivots 20, 21 is one example of how to arrange a wide-angle pivot for the moveable jaw 15. The moveable jaw 15 can then be implemented with very compact dimensions. In other words, it can be implemented, for example, without special elbows or lugs protruding from it, which could, for example, interfere with the operation of the work device 10 and/or visibility, or could also increase the weight or imbalance of the work device 10.

On the other hand, the hydraulic actuator 17 can also be relatively short, to create a large movement for the moveable jaw 15. The stroke of the operating element 19 of the hydraulic actuator 17 arranged to move can be, despite the large movement range of the jaw only 150-300 mm. The maximum opening of the grab 16, i.e. the greatest distance between the points of the claws 33, 40 of the jaws 14, 15 when the moveable jaw 15 is in the extreme position and the grab 16 is thus open, is, for with the order of size of the work device 10 according to the example, 1300-1500 mm. The opening can vary according to the order of size.

The arm mechanism 18 and its pivots 20, 21 are arranged in such a way that the farthest pivot 21 of the arm mechanism 18 relative to the hydraulic actuator 17 and, more especially to its operating element 19 arranged to move, can be arranged to move behind the rotation pivot 22 of the moveable jaw 15, in the extreme position of the moveable jaw 15. This extreme position is when the grab 16 is fully closed (FIG. 5). Thus, the claws 40 of the moveable jaw 15 are arranged to intermesh with the claws 33 of the fixed jaw 14. The grab 16 can then be completely closed as the jaws 14, 15 intermesh with each other. In this situation, the rotation pivot 22 of the moveable jaw 15 is between the hydraulic actuator 17 and the pivot 21, arranged in connection with the moveable jaw 15, which belongs to the arm mechanism 18. FIG. 5, for example, shows this situation. This is only one example of a way to define both the implementation of the arm mechanism 18 and also the setup of the wide-angle pivot 53 and movement in connection with the invention.

According to one embodiment, the arm mechanism 18 can be said to include a jaw arm 23, including two pivots 20, 21. The jaw arm 23 is arranged to rotate the moveable jaw 15, with the linear movement of the moving operating element 19 of the hydraulic actuator 17. According to the embodiment described, the jaw arm 23 can be formed of two adjacent arms connected to the pivot points. At its first end, the jaw arm 23 is pivoted to the hydraulic actuator 17 and now most particularly to the loop fitted to the end of its moving operating element 19. At the other, opposite end, the jaw arm 23 is pivoted to the moveable jaw 15. In the jaw 15 there is an opening 38 in its base part 28 (or in the quick-release connector 47 of the jaw 15) for a pivot 21, implemented once again an adjacent pair of openings. The pivot 21 is in the base part 28 of the jaw 15 (or in the quick connector 47 of the jaw 15), at a distance from the rotation pivot 22 of the jaw 15. If either a pushing or pulling movement is directed, by the moving operating element 19 of the hydraulic actuator 17, through the jaw arm 23 to the pivot point 21 of the jaw arm 23 fitted to the base part 28, the jaw 15 is forced to rotate relative to its rotation pivot 22, thus either opening or closing the grab 16.

According to one embodiment, the jaw arm 23 is arranged to be curved, to form a turning rod to the moveable jaw 15.

The hydraulic actuator 17 can then be located mainly horizontally in the body 11 of the work machine 10 and nevertheless achieve a very wide motion range for the moving jaw 15, especially for closing the grab 16, i.e., for bringing it out of the way, intermeshed by the fixed jaw 14. In addition, the hydraulic actuator 17 is then shielded inside the casing structure 29. The jaw arm 23 then rotates behind the rotation pivot 22 of the moving jaw 15 as the grab 16 closes. In other words, the rotation pivot 22 is then located on the concave side of the curved jaw arm 23. This rotation is very clearly seen, for example, in FIG. 11.

In the embodiment described, the arm mechanism 18 also includes a rotatable lever arm 24. The lever arm 24 is fitted between the jaw arm 23 and the body 11. The lever arm 24 is now used to ensure that the movement of the jaw arm 23 created by the operating element 19 of the hydraulic actuator 17 arranged to move, is arranged to be converted into a rotational movement of the moveable jaw 15. Thus, the lever arm 24 is arranged to act on the jaw arm 23. The lever arm 24 then controls the movement of the jaw arm 23 in such a way that the jaw arm 23 is not able to rotate relative to the jaw 15 without the jaw 15 rotating at the same time. In other words, the lever arm 24 is used to ensure that the jaw arm 23 acts over the entire motion range as an element either pushing or pulling the jaw 15, in other words, the linear movement created by the hydraulic actuator 17 is retained over the entire motion range of the jaw 15 up to the jaw 15, and is transmitted to the jaw 15. This happens, even though the pivot 21 of the jaw arm 23 rotates behind the rotation pivot 22 of the jaw 15 relative to the operating element 19 of the hydraulic actuator 17 (FIG. 5).

The lever arm 24 also protects the actuator 17 in the wide-angle pivot setup 53. Due to it, the motion of the operating element 19 of the actuator 17 is certain to be kept straight the whole time, despite the large rotation angle of the jaw 15, and no torsion acts on it, in which case the operating device 17 would be strained or possibly even break.

The lever arm 24 is equipped with pivoting 25, 26, now fitted to the operating element 19 of the hydraulic actuator 17 arranged to move, and to the body 11. The lever arm 24 can also be formed of two adjacent arms. There are pivot openings 39.1, 39.2 for the pivoting 25, 26, in the ends of the lever arm 24. The pivoting 25 to the moving operation element 19 of the hydraulic actuator 17 takes place by a pin 59 from a loop at its end. In the body 11 there can be, in turn, a pivot opening 45, for example, arranged to a lug 64 for the pivoting 26 of the lever arm 24 to the body 11, using a pin 60 (FIGS. 3, 6, and 7).

Because two of the pivots 20, 25 of the arm mechanism 18 are fitted to the same pivot point, i.e. now to the end of the moving operating element 19 of the hydraulic actuator 17, the pivots 20, 21, 25, 26 belonging to the arm mechanism 18 can now also be said, in the case according to the embodiment described, to be fitted to the triangular geometry. The triangle is then formed between the pivots 20 (25), 21, 26 of the arm mechanism 18. According to another embodiment, the lever arm 24 can also be fitted to pivot to some point on the jaw arm 23, instead of the operating element 19. However, this leads to one additional pivot in the wide-angle pivot setup 53 according to the embodiment described.

According to one embodiment, the implementation of the arm mechanism 18, particularly in the placing of the pivots 21, 22, can also be defined by straight distances D1, D2 from the point 27 of the moveable jaw 15 to the pivots 21, 22 (FIG. 4) fitted to the base part 28 at its opposite end. The distance D1 from the points 27 of the moveable jaw 15 to the pivot 21 fitted to the moveable jaw 15 for the jaw arm 23, is greater than the corresponding distance D2 from the points 27 of the moveable jaw 15 to the rotation pivot 22 of the jaw 15.

According to one embodiment, the width W1 of the moveable jaw 15 can be 10-60% of the width W2 (FIG. 1) of the fixed jaw 14. Besides this improving the visibility of the grab 16, the grab 16 is also made lighter. The wider fixed jaw 14 is very suitable, for example, for raking, stump lifting, and other soil-tilling work, in which the work device 10 is used without the moveable jaw 15. This is also helped by the wide-angle movement of the moveable jaw 15. Thanks to the invention, it can be turned well clear, even in both directions, when not needed. The moveable jaw 15, which is narrower than the fixed jaw 14, is also not so liable to be caught in obstacles, for example, in demolition work.

One way to implement the structure of the moveable jaw 15 is to connect its pointed 27 claws 40 from the side surfaces of the base 41 by plate flanges. In the moveable jaw 15, there are two or more claws 40, i.e., working widths, for example for gripping objects with the grab 16. At the opposite end of the jaw 15 to the points 27, there is now a tubular beam 43. The roots 41 of the claws 40 and the sheet metal-flanges 42 now join to the tubular beam 43. In the case of the lug-less base plate 28 of the moveable jaw 15, equipped with pivots 21, 22, which is at the opposite end of the jaw 15 to the point 27 of the jaw 15, the implementation can, according to one embodiment, be such that an integral sheet-metal work piece 44, which is also called a quick connector 47 later in the description, in which the pivots of the moveable jaw 15 are fitted, i.e. the rotation pivot 22 of the moveable jaw 15 and the pivot 21 of the arm mechanism 18 in the side of the moveable jaw 15, can be fitted to the base part 28. Thanks to the lack of lugs, the curve radius of the arm mechanism 18 of the moveable jaw 15, more particularly of the pivot 21 of its jaw arm 23, can be at a maximum the width of its base part 28.

Figures 8A, 8B:
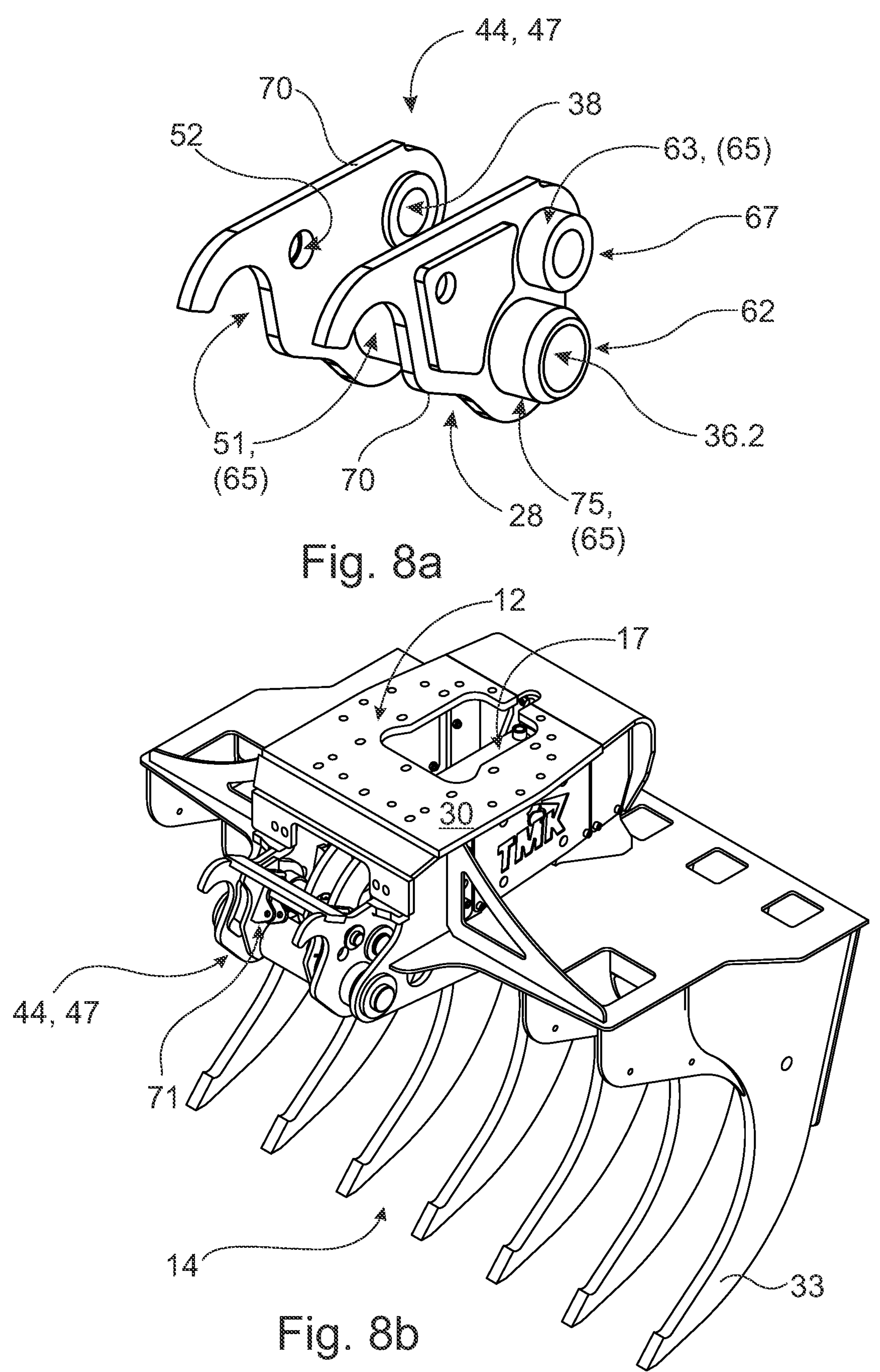
FIG. 8*a* shows the quick-release connector for the moving element of the work device.
FIG. 8*b* shows the work device without the moveable jaw in the case of another embodiment, with an operating device, of the quick-connector, without the operating devices.

More generally, the sheet-metal work piece 44 can also act as an adapter, and even more particularly as a quick connector 47 for the moveable jaw 15, more generally for the moveable work element 15'. FIG. 8*a* shows a first example of a quick connector 47 for the moveable work element 15'. In the quick connector 47, there are then attachment means 66, such as, for example, a pin 48. By means of the pin 48, it can be attached through openings 52 to holes 50 fitted to the attachment lugs 49 of the movable jaw 15. In addition, the quick connector 47 can also include downwardly opening hooks 51. The hooks 51 align and support in the jaw 15 the tubular beam 43 fitted to it. Further, in connection with an opening 36.2 arranged in the quick connector 47 for the rotation pivot 22 of the jaw 15, there can be collars 62 protruding axially on both sides of the relevant pair of openings. There can be a pair of openings 38 in the quick connector 47 for the pivot 21. In it too, there can be axially protruding collars 67. Here the outer surfaces 63 of the collars 67 form an alignment surface 65 for the moveable jaw 15. The under surfaces 74 of the points 73 in the lugs 49 of the moveable jaw then settle against the outer surface 63 of the collars 67.

Figure 11:
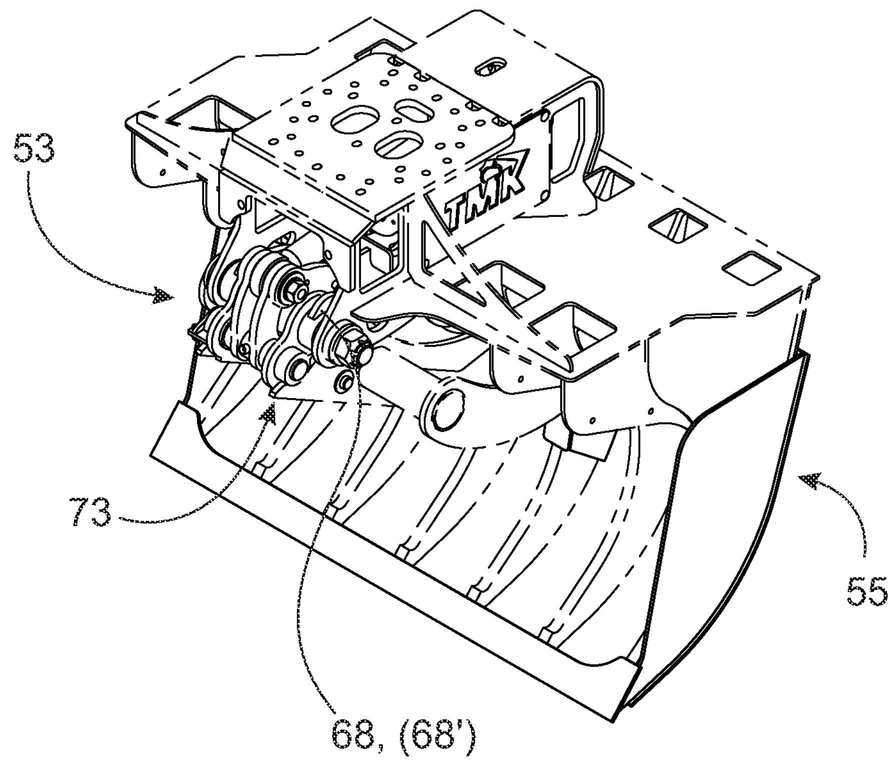
FIG. 11 shows the accessory of FIG. 10, fitted to the fixed jaw of the work device.

In addition, in the moveable jaw 15 there can be, in the lugs 49 arranged as extensions of its middle-most claws 40, now in their lower parts, channel-like claws 68, of which the point of the one claw 68 appears in FIG. 11. The collars 62 of the rotation pivot 22 of the jaw 15 are arranged to align with these claws 68, when the moveable jaw 15 is attached to the quick connector 47 and thus to the work device 10.

The claws 68 then oppose the outer surface 75 of the collars 62, which in this context can also be called the alignment surface 65. Thus, the claws 68 act as a kind of hanger 68'. In other words, the hook-like formations 51, 68 in the quick connector 47 and lugs 49 are opposite in these, when the jaw 15 is attached in the quick connector 47. The collars 67 and hooks 51 align the holes 52 and 50 in the quick connector 47 and lugs 49 with each other when fitted the work element 15' to the quick connector 47 and the attachment pin 48, i.e. the attachment means 66 is then easily put into the holes 52, 50 intended for it, and the work element 15' is attached to the quick connector 47 and through it to the body 11 of the work device 10. Thus, the outer surfaces 63 in the hooks 51 and collars 67 can be said to be alignment surfaces 65 to align the moveable jaw 15 with the quick connector 47 when attaching it to the work device 10. Correspondingly, the quick connector 47 also includes an opening 52 for the attachment element 66, by which the moveable jaw 15 is arranged to be attached to the quick connector 47.

FIG. 8*b* shows the work device 10, equipped with a quick connector 47 according to another embodiment, without the moveable jaw 15. According to what is shown in FIG. 8*b*, the quick connector 47 can be, when changing the work element 15' in it, fixed in the body 11 by a pin 37 in the rotation pivot 22 arranged in it, and by a pin 61 in the pivot 21 arranged for it in the jaw arm 23. Using the quick connector 47 permits the moveable jaw 15, for example, to be quickly exchanged for a stump-chopping blade or other work element, if so wished.

Figure 9:
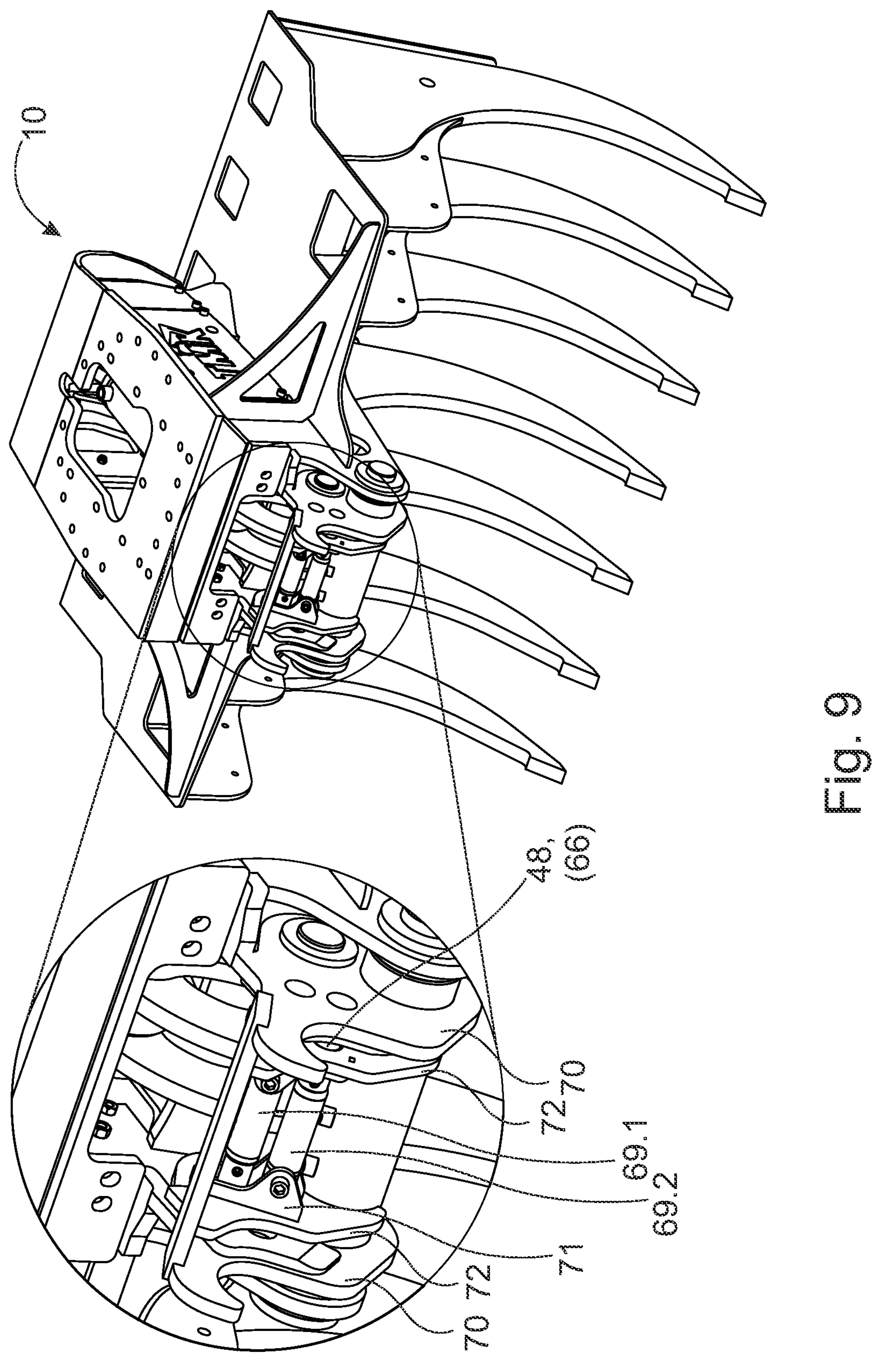
FIG. 9 shows the part of the work device shown in FIG. 8*b*, now with the operating devices of the quick-connector.

In another embodiment of the quick connector 47 shown in FIGS. 8*b* and 9, the locking of the jaw 15 to the quick connector 47 and thus to the work device 10 now happens with an operating device. The use of an operating device can be, for example, an option in the quick connector 47. This may then include mechanical attachment according to the embodiment of FIG. 8*a* or, on the other hand, it may not.

In the embodiment shown, the attachment mechanism now includes two small hydraulic cylinders 69.1, 69.2. They are placed between the pivot plates 70 belonging to the quick connector 47, being thus protected. There are now two hydraulic cylinders 69.1, 69.2, set in opposite directions to each other. There are attachment lugs 71 for them in the pivot plates 70, from which they are attached to the quick connector 47 by one end. FIG. 8*b* shows only the option for such an operating device, i.e. in it there are only lugs 71 without cylinders and the jaw 15 is attached by a pin 48. In FIG. 9 in turn this option is also realized, i.e. it includes the actual operating devices 69.1, 69.2 in the lugs 71. At the opposite end of the hydraulic cylinders 69.1, 69.2 is an operating element arranged to move back and forwards. The operating element can now act as an attachment means 66 creating locking. Thus, it can act directly as a locking pin 48, or indirectly act on a separate locking pin or mechanism.

Here, in the embodiment shown in FIGS. 8*b* and 9, there are separate sheet-metal pieces 72 fitted close to and between the pivot plates 70. There is then a small gap between the sheet-metal pieces 72 and the pivot plates 70. The gap is such that the attachment lugs 49 of the movable jaw 15 can be fitted inside it. Then there are also inner collars (not shown) oriented between the pivot plates 70, in the opening 38 arranged for the pivot 21, instead of the protruding collars 67 of FIG. 8*a*. The outer surface of the inner collars then acts for a similar purpose as in the embodiment of FIG. 8*a*, i.e. as an alignment surface 65 for the under surfaces 74 (FIG. 6) in the points 73 of the lugs 49 of the jaw 15.

The easy interchangeability of the work element permitted by the quick connector 47 acting as an adapter further increases the versatility of the work device 10. Instead of detaching and attaching two larger pivots 21, 22, the quick connector 47 permits the changing of the work element 15' with the detaching and replacement of only a single preferably smaller pin 48 relative to the pivots 21, 22. This accelerates changing one work element 15' for another. In addition, the attachment pin 48 is in an open place, relative to the pivots 21, 22, for its detaching and attaching.

According to another embodiment, the pivots 21, 22 of the moveable jaw 15 could also be directly in the lugs 49 formed as extensions of its middle claws 40.

According to one embodiment, there can be a bulldozer blade 46 located on the rear side of the fixed jaw 14, i.e., on the opposite end to the claws 33. This can be used, for example, to level soil, i.e., the work device 10 can then also act as a drag. This property is useful, for example after stone lifting by the work device 10. The bulldozer blade 46 can then be used to level the site by filling the pit created.

Above the hydraulic actuator 17 is a known double-acting liquid operated hydraulic cylinder, equipped with a single piston and piston rod. According to one embodiment, the hydraulic actuator 17 of the work device 10 can also be, for example, the variable force hydraulic cylinder formed by nesting operating elements, disclosed in the applicant's international patent application PCT/FI2017/050699 or PCT/FI2019/050287. Using these, quick operation and, if necessary, also a great compressive force can be obtained for the grab 16 of the work device 10.

Figure 10:
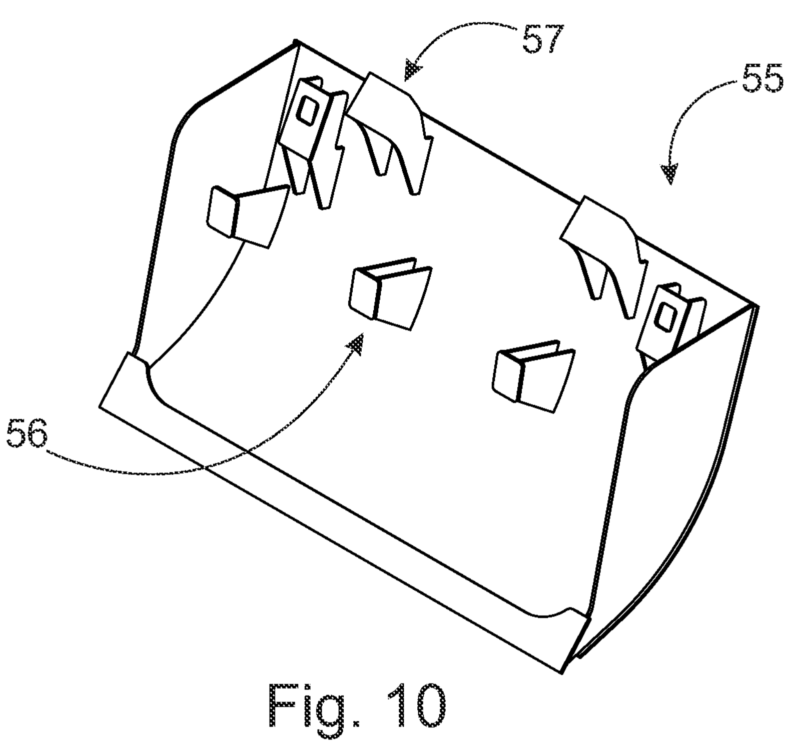
FIG. 10 shows an accessory for the work device, which can be fitted to its fixed jaw.

FIGS. 10 and 11 show yet another accessory for the work device 10 according to the invention. This is a bucket 55. The bucket 55 can be permanently joined to the fixed jaw 14. If the bucket 55 is threaded onto the claws 33 of the fixed jaw 14 by the lugs 57 fitted to it, like a glove on a hand, the bucket 55 is picked up by the work device 10 and remains in place by closing the grab 16, i.e. by pressing the moveable jaw 15 onto the bucket 55. For gripping, there are counterpieces 56 in the bucket 55 for the moveable jaw 15. In other words, the moveable jaw 15 then presses the bucket 55 in place and also holds it in the grip of the grab 16, closed in contact with the fixed jaw 14. This too is aided by the wide-angle pivot setup 53. Thanks to it most of the bucket 55 remains from its lower part completely open and thus available for working. The bucket 55 can also be equipped, for example, with locks. Then, if needed, the bucket 55 can also remain in place, even if the moveable jaw 15 is used for normal work, i.e. even if it is not holding the bucket 55 in place. The moveable jaw 15 too can be equipped on the "glove principle", i.e. by a bucket that can be closed on the jaw 15 and/or an exchangeable bucket, which can be, for example, detachably attached to the quick connector 47.

The work device 10 according to the invention is very versatile. Thus, in connection with the invention one can speak of a multi-purpose grab. Its application is not limited purely to gripping an object with jaws 14, 15 arranged to form a grab 16, instead it can be used to perform several other operations too. Examples are stump, stone, and root-lifting and raking, collecting material either with the grab 16 or then even with only a fixed jaw 14 (e.g., energy timber, stumps, branches, and stones) and soil tilling, and demolishing buildings. This means that there is no need to change tools 10 in a work machine, such as, for example, an excavator, between operations, instead all operations can be performed effectively and with high quality on one and the same run. Though attaching tools is nowadays taken care of with various quick-connection solutions, their changing inevitably takes time, for example, on extensive work sites, at least through the driving needed for changing tools, and this is lost from productive work. In addition, owing to the invention there is no need to procure tools for several different tasks. One can operate using a single quick-connection solution between the boom end and the tool 10.

It should be understood that the above description and the related figures are intended only to illustrate the present invention. The invention is thus not restricted to only the embodiments described above or defined in the Claims, instead many different variations and adaptations, which are possible within the scope of the inventive idea defined in the accompanying Claims, will be obvious to one versed in the art.

The invention claimed is:

1. A work device, comprising:

a body comprising an attachment arrangement for arranging the work device at an end of a set of booms of a work machine;

a pair of jaws fitted to the body and arranged to form a grab, of which one of the jaws of the pair of jaws is a fixed jaw fitted permanently and immovably fixed to the body and the other of the jaws of the pair of jaws is a rotatable jaw arranged separately from the attachment arrangement, and pivoted rotatably to the body to open and close the grab, the rotatable jaw comprising a base part at one end thereof, the base part comprising a rotation pivot;

claws fitted to each of the fixed and rotatable jaws in which the claws of the rotatable jaw are arranged to intermesh with the claws of the fixed jaw for bringing the rotatable jaw out of way of the fixed jaw;

a hydraulic actuator having one end attached to the body of the work device and comprising a linearly moveable operating element arranged to act on the rotatable jaw to open and close the grab; and a wide-angle pivot setup arranged to the work device between the moveable operating element of the hydraulic actuator and the rotatable jaw to open and close the grab by using only the rotatable jaw, wherein the wide-angle pivot setup comprises an arm mechanism that includes:

a jaw arm having two pivots fitted on the jaw arm, wherein one of the two pivots is connected to the movable operating element of the hydraulic actuator, and the other of the two pivots are connected to the base part comprising the rotation pivot of the rotatable jaw; and a rotatable lever arm arranged between the jaw arm and a first pivoting in the body;

wherein the arm mechanism is arranged to rotate the moveable jaw by converting the linear movement of the movable operating element of the hydraulic actuator into a rotational movement of the rotatable jaw; and wherein a rotation angle of the movement of the rotatable jaw by the wide-angle pivot setup has a magnitude of more than 120°.

2. The work device according to claim 1, wherein the jaw arm is curved to form a connecting rod to the rotatable jaw.

3. The work device according to claim 1, wherein the fixed jaw comprises an inner curve arranged to extend over most of the body; and a share of the fixed jaw is arranged to be more than half of the grab.

4. The work device according to claim 1, wherein a stroke of the moveable operating element of the hydraulic actuator is in a range of 150-300 mm.

5. The work device according to claim 1, wherein the wide-angle pivot setup is arranged to create a rotational movement in the rotatable jaw, the magnitude of which is in a range of 140°-180°.

6. The work device according to claim 1, wherein: a width of the rotatable jaw is in a range of 10-60% of a width of the fixed jaw; and the rotatable jaw comprises two or more claws.

7. The work device according to claim 1, wherein:

the body comprises a casing structure inside of which the hydraulic actuator is fitted; and the attachment arrangement is fitted to an upper surface of the casing structure.

8. The work device according to claim 7, wherein:

the body comprises a sheet-metal structure arranged to extend laterally in the work device on both sides of the casing structure; and the fixed jaw comprises a root from which the fixed jaw is arranged to connect to the sheet-metal structure.

9. The work device according to claim 8, wherein the root of the fixed jaw comprises extensions arranged to continue under the body to extend a reach of an inner curve of the fixed jaw from an upper part of the grab.

10. The work device according to claim 9, wherein:

the extensions belonging to the root of the fixed jaw are arranged in zones laterally in the grab so that in a middle area of the grab one of the extensions is lower, thus forming a larger space in the bottom of the grab; and on both sides of the rotatable jaw, in the lateral direction of the grab, the extensions are arranged to be higher than the one extension fitted to the middle area of the grab.

11. The work device according to claim 1, wherein:

the claws of the rotatable jaw are joined together at side surfaces of bases of the claws by sheet-metal flanges; and the rotatable jaw comprises two ends of which an opposite end of the rotatable jaw relative to end points of the rotatable jaw comprises a tubular beam to which the bases of the claws and sheet-metal flanges are arranged to connect.

12. A work device, comprising:

a body comprising an attachment arrangement for arranging the work device at an end of a set of booms of a work machine;

a pair of jaws fitted to the body and arranged to form a grab, of which one of the jaws of the pair of jaws is a fixed jaw fitted permanently and immovably fixed to the body and the other of the jaws of the pair of jaws is a rotatable jaw arranged separately from the attachment arrangement;

and pivoted rotatably to the body to open and close the grab, the rotatable jaw comprising a base part at one end thereof, the base part comprising a rotation pivot;

claws fitted to each of the fixed and rotatable jaws in which the claws of the rotatable jaw are arranged to intermesh with the claws of the fixed jaw for bringing the rotatable jaw out of way of the fixed jaw;

a hydraulic actuator having one end attached to the body of the work device and comprising a linearly moveable operating element arranged to act on the rotatable jaw to open and close the grab; and a wide-angle pivot setup arranged to the work device between the moveable operating element of the hydraulic actuator and the rotatable jaw to open and close the grab by using only the rotatable jaw, wherein the wide-angle pivot setup comprises an arm mechanism that includes:

a jaw arm having two pivots fitted on the jaw arm, wherein one of the two pivots is connected to the movable operating element of the hydraulic actuator, and the other of the two pivots are connected to the base part comprising the rotation pivot of the rotatable jaw; and a rotatable lever arm arranged between the jaw arm and a first pivoting in the body;

wherein the arm mechanism is arranged to rotate the moveable jaw by converting the linear movement of the movable operating element of the hydraulic actuator into a rotational movement of the rotatable jaw;

wherein a rotation angle of the movement of the rotatable jaw by the wide-angle pivot setup has a magnitude of more than 120°; and wherein the other of the two pivots in the jaw arm of the arm mechanism is further from the moveable operating element of the hydraulic actuator than the one pivot, and, in a closed extreme position of the rotatable jaw, is arranged by the wide-angle pivot setup behind the rotation pivot of the rotatable jaw, relative to the moveable operating element of the hydraulic actuator.

13. The work device according to claim 12, wherein the claws of the fixed and rotatable jaws each have an end point and a distance from the end points of the claws of the rotatable jaw to the other pivot of the jaw arm is greater than a distance from the end points of the claws of the rotatable jaw to the rotation pivot of the rotatable jaw.

14. The work device according to claim 13, wherein:

the rotatable jaw comprises a base part at an opposite end of the rotatable jaw from the end points of the rotatable jaw, in which the base part is without lugs; and the rotation pivot of the rotatable jaw and the other pivot of the jaw arm at a side of the rotatable jaw are fitted to the lug-less base part.

15. The work device according to claim 12, further comprising a quick connector to attach the rotatable jaw detachably to the work device, the quick connector comprising:

the rotation pivot of the rotatable jaw;

the other pivot of the jaw arm fitted to the rotatable jaw;

at least one alignment surface to align the rotatable jaw relative to the quick connector; and at least one opening for an attachment element, by which the rotatable jaw is arranged to be attached to the quick connector.

16. The work device according to claim 15, wherein:

the rotatable jaw comprises an upwardly opening hanger which is arranged to align with a collar arranged for the hanger in the quick connector; and the quick connector comprises downwardly opening hooks arranged to align with a tubular beam belonging to the rotatable jaw.

17. A work device, comprising:

a body comprising an attachment arrangement for arranging the work device at an end of a set of booms of a work machine;

a pair of jaws fitted to the body and arranged to form a grab, of which one of the jaws of the pair of jaws is a fixed jaw fitted permanently and immovably fixed to the body and the other of the jaws of the pair of jaws is a rotatable jaw arranged separately from the attachment arrangement and pivoted rotatably to the body to open and close the grab, the rotatable jaw comprising a base part at one end thereof, the base part comprising a rotation pivot;

claws fitted to each of the fixed and rotatable jaws in which the claws of the rotatable jaw are arranged to intermesh with the claws of the fixed jaw for bringing the rotatable jaw out of way of the fixed jaw;

a hydraulic actuator having one end attached to the body of the work device and comprising a linearly moveable operating element arranged to act on the rotatable jaw to open and close the grab; and a wide-angle pivot setup arranged to the work device between the moveable operating element of the hydraulic actuator and the rotatable jaw to open and close the grab by using only the rotatable jaw, wherein the wide-angle pivot setup comprises an arm mechanism that includes:

a jaw arm having two pivots fitted on the jaw arm, wherein one of the two pivots is connected to the movable operating element of the hydraulic actuator, and the other of the two pivots are connected to the base part comprising the rotation pivot of the rotatable jaw; and a rotatable lever arm arranged between the jaw arm and a first pivoting in the body, wherein the rotatable lever arm comprises a second pivoting fitted to the moveable operating element of the hydraulic actuator; and wherein the arm mechanism is arranged to rotate the moveable jaw by converting the linear movement of the movable operating element of the hydraulic actuator into a rotational movement of the rotatable jaw;

wherein a rotation angle of the movement of the rotatable jaw by the wide-angle pivot setup has a magnitude of more than 120°.

* * * * *